(12) United States Patent
Kuwata

(10) Patent No.: US 6,539,463 B1
(45) Date of Patent: Mar. 25, 2003

(54) DISK-ARRAY APPARATUS CAPABLE OF PERFORMING WRITING PROCESS IN HIGH TRANSMISSION SPEED AND SURELY AVOIDING DATA LOSS

(75) Inventor: Atsushi Kuwata, Tokyo (JP)

(73) Assignee: NEC Corporation, Tokyo (JP)

( * ) Notice: Subject to any disclaimer, the term of this patent is extended or adjusted under 35 U.S.C. 154(b) by 77 days.

(21) Appl. No.: 09/707,972

(22) Filed: Nov. 8, 2000

(30) Foreign Application Priority Data

Nov. 9, 1999 (JP) .......................................... 11-317692

(51) Int. Cl.[7] .............................................. G06F 12/16
(52) U.S. Cl. ........................... 711/162; 711/5; 711/112; 711/113; 711/114; 711/161; 714/6; 714/7
(58) Field of Search ................................. 711/114, 161, 711/162, 118, 5, 112, 113; 714/6, 42, 7

(56) References Cited

U.S. PATENT DOCUMENTS 5,873,126 A * 2/1999 Singh .......................... 711/205
6,105,116 A * 8/2000 Mori .......................... 711/113
6,223,301 B1 * 4/2001 Santeler et al. ................. 714/6

* cited by examiner

Primary Examiner—Reginald Bragdon
Assistant Examiner—Jasmine Song
(74) Attorney, Agent, or Firm—Sughrue Mion PLLC

(57) ABSTRACT

A disk-array apparatus comprises a plurality of disk-medium modules, a first through a fourth memory modules, and a director module connected to a host. The first and the third memory modules are combined with each other so as to serve as a first memory module-pair. The second and the fourth memory modules are combined with each other so as to serve as a second memory module-pair. The director module writes, when a future occurs in the first memory module, fast-write data to the second and the fourth memory modules of the second memory module-pair and appoint two memory modules optionally selected from the second through the fourth memory modules for respectively performing cache control regions.

10 Claims, 4 Drawing Sheets

FIG. 2
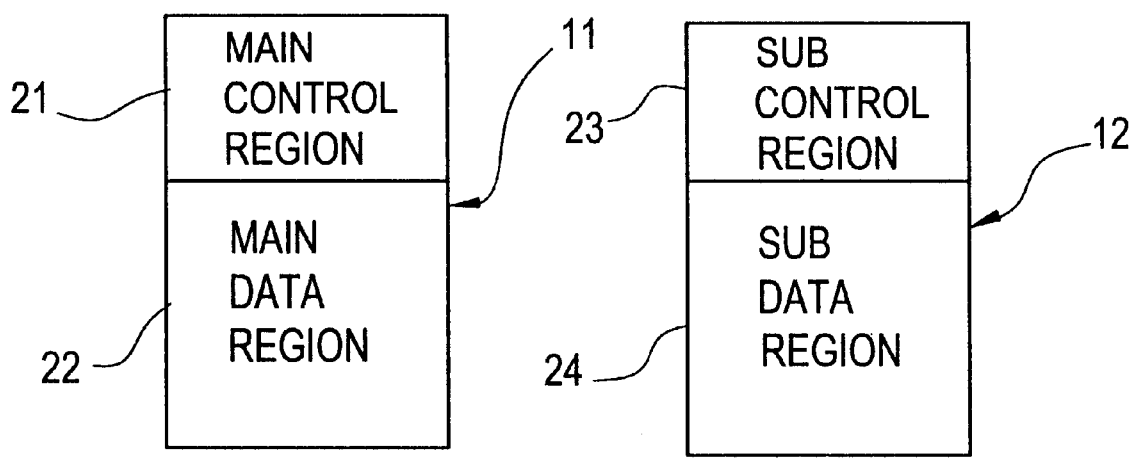
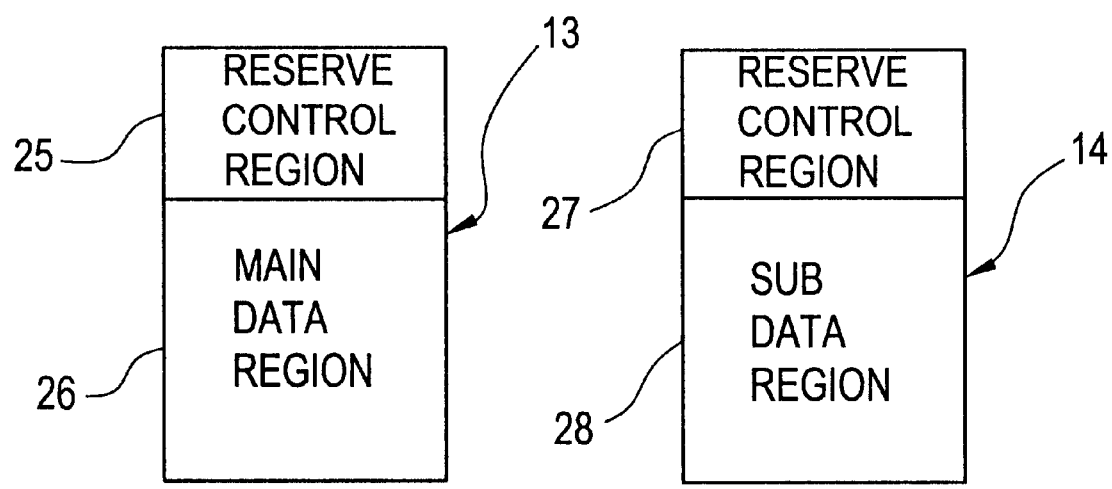

DISK-ARRAY APPARATUS CAPABLE OF PERFORMING WRITING PROCESS IN HIGH TRANSMISSION SPEED AND SURELY AVOIDING DATA LOSS

BACKGROUND OF THE INVENTION

This invention relates to a disk-array apparatus for use in combination with a host which serves as an upper-layer data processing apparatus such as a computer apparatus and which can write/read data to/from said disk-array apparatus and having a plurality of disk-medium modules and, in particular, to the disk-array apparatus further having a disk cache interposed between the host and the disk-medium modules for temporarily memorizing the data.

Generally, the disk-array apparatus has the disk cache (cache memory) in order to accelerate an access speed by the host to the disk-array apparatus. When the host performs a writing process (step) for writing data to the disk-array apparatus, writing data to be written into the disk-array apparatus are temporarily memorized in the disk cache. When the writing data is temporarily memorized in the disk cache, the disk cache or the disk-array apparatus performs a fast-write process. The fast-write process serves to inform to the host that the writing process is completed.

In the fast-write process, when the writing data transmitted from the host is memorized in the disk cache (a memory module), the above-mentioned information expressing that the writing process is completed is informed to the host. Therefore, the writing data to be updated may be disappeared or vanished by unexpected error before the writing data is practically written in the disk-array apparatus. This is called a data loss. In order to avoid the data lops, it is necessary to make the writing data into duplex data by providing backing-up data. Namely, the disk-array apparatus generally duplicates the writing data to make the duplex data by providing dual memory modules in order to avoid the data loss.

By making the writing data into duplex data as mentioned above, the disk-array apparatus will have redundancy.

However, if one of the memory modules of the disk-array apparatus fails, the memory modules perform degraded or degenerate mode by the other one of the memory modules. In case where the memory modules are operated in the degraded mode, the redundancy is spoiled. If the other one of the memory modules fails when the disk-array apparatus spoiling the redundancy performs the fast-write process, the writing data may be damaged.

On the other hand, if the fast-write process is forbidden, without exception, during the memory modules perform in the degraded mode, the writing data will not be damaged although the other one of the memory modules fails. However, the writing process will not be increased in transmission speed. Namely, the disk-array apparatus undesirably and considerably reduced in its performance.

The above-mentioned points are both very important for the disk-array apparatus to perform the writing process in high transmission speed and to avoid the data lose. Therefore, they are preferable and necessary for the disk-array apparatus to perform the writing process in high transmission speed and to avoid the data loss at the same time.

SUMMARY OF THE INVENTION

It is an object of this invention to deal with disadvantages mentioned above and to therefore provide a disk-array apparatus to be used for a host capable of performing a writing process in high transmission speed and to surely avoiding a data loss at the same time.

The other object, features, and advantages of this invention will become clear as the description proceeds.

This invention is directed to a disk-array apparatus for use in combination with a host which serves as a data processing apparatus, the disk array apparatus comprising a plurality of disk-medium modules, a plurality of memory modules, and a director module connected to the hose, the disk-medium modules, and the memory modules, the director module being for carrying out writing and reading operations of writing and reading the data to and from the disk-medium modules under control of the host and for temporarily storing the data to the memory modules when the director module carries out the writing and the reading operations. The memory modules comprise a first through a fourth memory modules. The first and the second memory modules are combined with each other so as to serve as a first memory module-pair. The third and the fourth memory modules are combined with each other so as to serve as a second memory module-pair. The director module writes, when a failure occurs in the fist memory module, fast-write data to the second and the fourth memory modules of the second memory module-pair and appoint two memory modules optionally selected from the second through the fourth memory modules for respectively performing cache control regions.

BRIEF DESCRIPTION OF THE DRAWINGS

FIG. 2 is a block diagram, showing control and data regions of memory modules of the disk-array apparatus shown in FIG. 1 when the disk-apparatus is operated in a normal state, for illustrating in detail operation of the disk-array apparatus;

DESCRIPTION OF THE PREFERRED EMBODIMENTS

Now, a preferred embodiment of this invention will be described with reference to Drawings.

Figure 1:
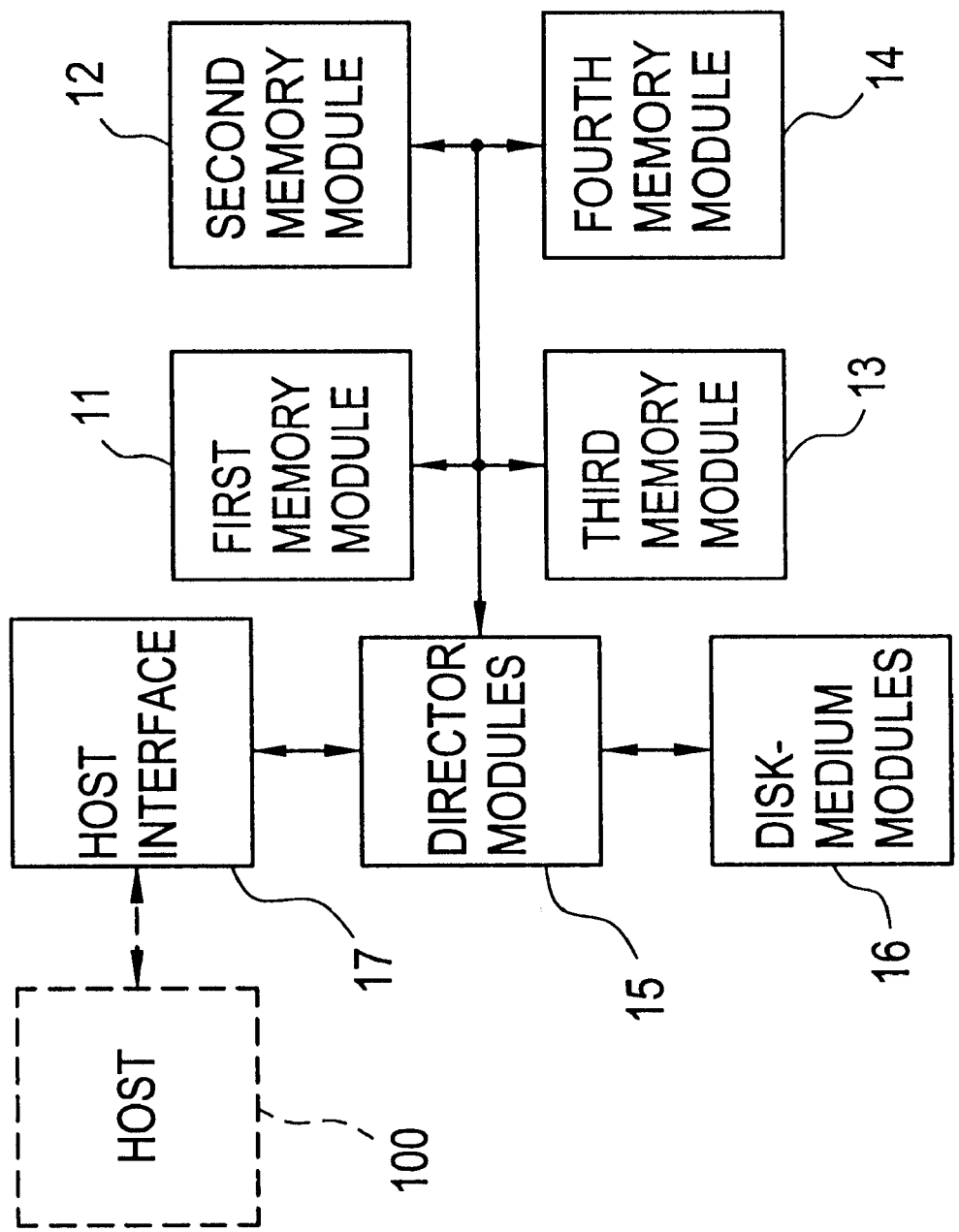
FIG. 1 is a block diagram of a disk-array apparatus according to an embodiment of this invention.

Referring to FIG. 1, a disk-array apparatus according to the embodiment of this invention is used in combination with a host 100 through a host interface 17. The host 100 solves as a data processing apparatus and can write/read data to/from the disk-array apparatus.

The disk-array apparatus comprises a plurality of disk-medium modules 16 and director modules 15 for controlling the disk-medium modules 16 and a plurality of memory modules mentioned below based on writing and reading operation by the host 100. The disk-medium modules 16 are used for writing/reading data thereto/therefrom by the host 100. The director modules 15 control the disk-medium modules 16 and the memory modules based on writing and reading operation by the host 100.

The disk-array apparatus further comprises a first through a fourth memory modules 11 through 14. The first to the fourth memory modules 11 to 14 serve as the memory modules interposed between the disk-medium modules 16 and the host 100 through the director modules 15. The first to the fourth memory modules 11 to 14 can temporarily memorize data as the disk caches.

When the disk-array apparatus is received an I/O (Input and Output) command through the host interface 17 from the host 100, the director modules 15 analyzes the I/O (Input and Output) command. Consequently, the director modules 15 perform an I/O operation based on the I/O command analyzed. For example, if the I/O command is for ordering the disk-array apparatus to Input the writing data, the director modules 15 transmit the writing data from the host 100 through the first to the fourth memory modules 11 to 14 to the disk-medium modules 16. On the other hand, if the I/O command is for ordering the disk-array apparatus to output the reading data, the director modules 15 transmit the reading data from the disk-medium modules 16 through the first to the fourth memory modules 11 to 14 to the host 100.

Next, arrangement of the data in the first to the fourth memory modules 11 to 14 during the disk-array apparatus performs the degraded or the degenerate mode will be described, referring to FIGS. 1 and 2.

As shown in FIG. 2, the first memory module 11 is appointed to perform a main control region 21 and a main data region 22. The second memory module 12 is appointed to perform a sub control region 23 and a sub data region 24. The third memory module 13 is appointed to perform a reserve control region 25 and a main data region 26. The fourth memory module 14 is appointed to perform a reserve control region 27 and a sub data region 28.

A control data for entirely controlling the first to the fourth memory modules 11 to 14 is memorized in the main control region 21 of the first memory module 11. Furthermore, the same data as the control data is memorized in the sub control region 23 of the second memory module 12. Both of the main data regions 22 and 26 of the first and the third memory modules 11 and 13 are used as the disk caches. Consequently, in the main data regions 22 and 26, the reading data from the disk-medium modules 16 or the writing data from the host 100 is memorized. The same data as the data memorized in the main data regions 22 and 26 are memorized as the other of the duplex data in the sub data regions 24 and 28, respectively. The main data, the sub data, the main data, and the sub data regions 22, 24, 26, and 28 can be used as both of reading cache and writing cache.

If the first memory module 11 fails and therefore the reading and/or the writing data memorized in the main control and the main data regions 21 and 22 are lost, the reading and/or the writing data are never lost. This is because the disk-array apparatus makes the reading and/or the writing data into the duplex data as mentioned below.

Figure 3:
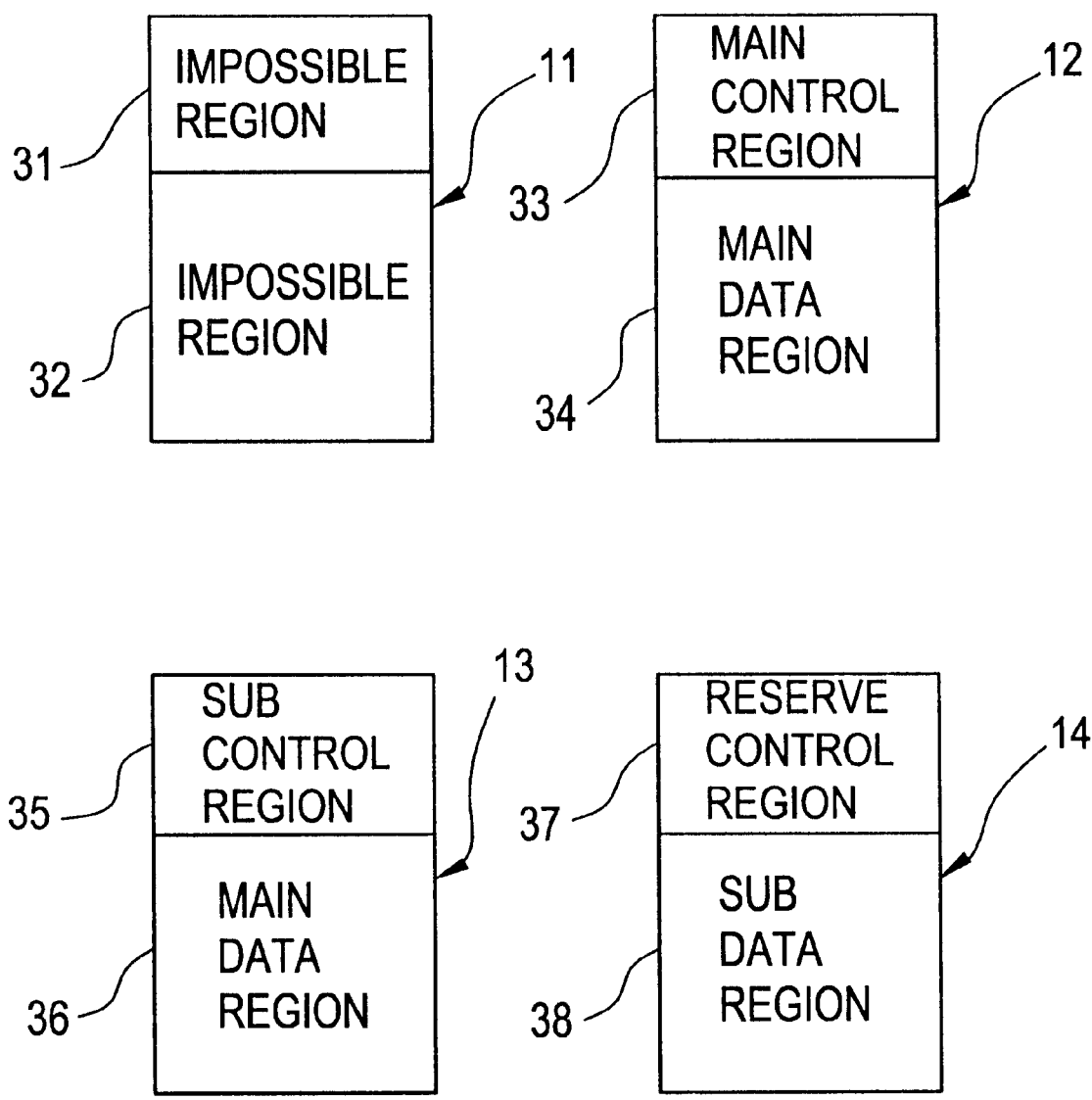
FIG. 3 is a block diagram, showing the control and the data regions of the memory modules of the disk-array apparatus shown in FIG. 1 when one of the memory modules fails, for illustrating in detail operation of the disk-array apparatus.

Referring to FIGS. 1 to 3, when the first memory module 11 fails, the reading and/or the writing data memorized in the main control and the main data regions 21 and 22 (shown in FIG. 2) are lost. Namely, the main data regions 21 and 22 are appointed as impossible regions 31 and 32 as shown in FIG. 3 by the director modules 15. When the impossible regions 31 and 32 are formed, the director modules 15 respectively change the sub control region 23 of the second memory module 12 (shown in FIG. 2) into the warn control region 33 as shown in FIG. 3.

The director modules 15 further change the reserve control region 25 of the third memory module 13 (shown in FIG. 2) into a sub control region 35 as shown in FIG. 3.

Furthermore, the director modules 15 change the sub data region 24 of the second memory module 12 (shown in FIG. 2) into main data region 34 as shown in FIG. 3.

Herein, no sub data region corresponding to the main data region 34 exists. In addition, although the main data and the sub data regions 26 and 28 of the third and the fourth memory modules 13 and 14 (shown in FIG. 2) are respectively changed into main data and sub data regions 36 and 38 of the third and the fourth memory modules 13 and 14 as shown in FIG. 3, these regions are only changed ostensibly but not changed substantially. Furthermore, the reserve control region 27 (shown in FIG. 2) of the fourth memory module 14 is also changed ostensibly into a reserve control region 37 as shown in FIG. 3.

Thus, the main data region 34 is used as the reading cache only. On the other hand, the main data and the sub data regions 36 and 38 are used as the writing caches.

Afterward, during the disk-array apparatus performs the degraded or the degenerate mode, the first memory module 11 failing is repaired or changed into the new memory module so that the disk-array apparatus is restored in redundancy.

However, another memory module except the first memory module 11 further may fail before the repair or the change of the first memory module 11. For example, if the second memory module 12 fails, the data memorized in the main data region 34 shown in FIG. 3 are lost. However, because the data memorized in the main data 34 is only used as the reading cache, the disk-array apparatus perform normal operation.

Figure 4:
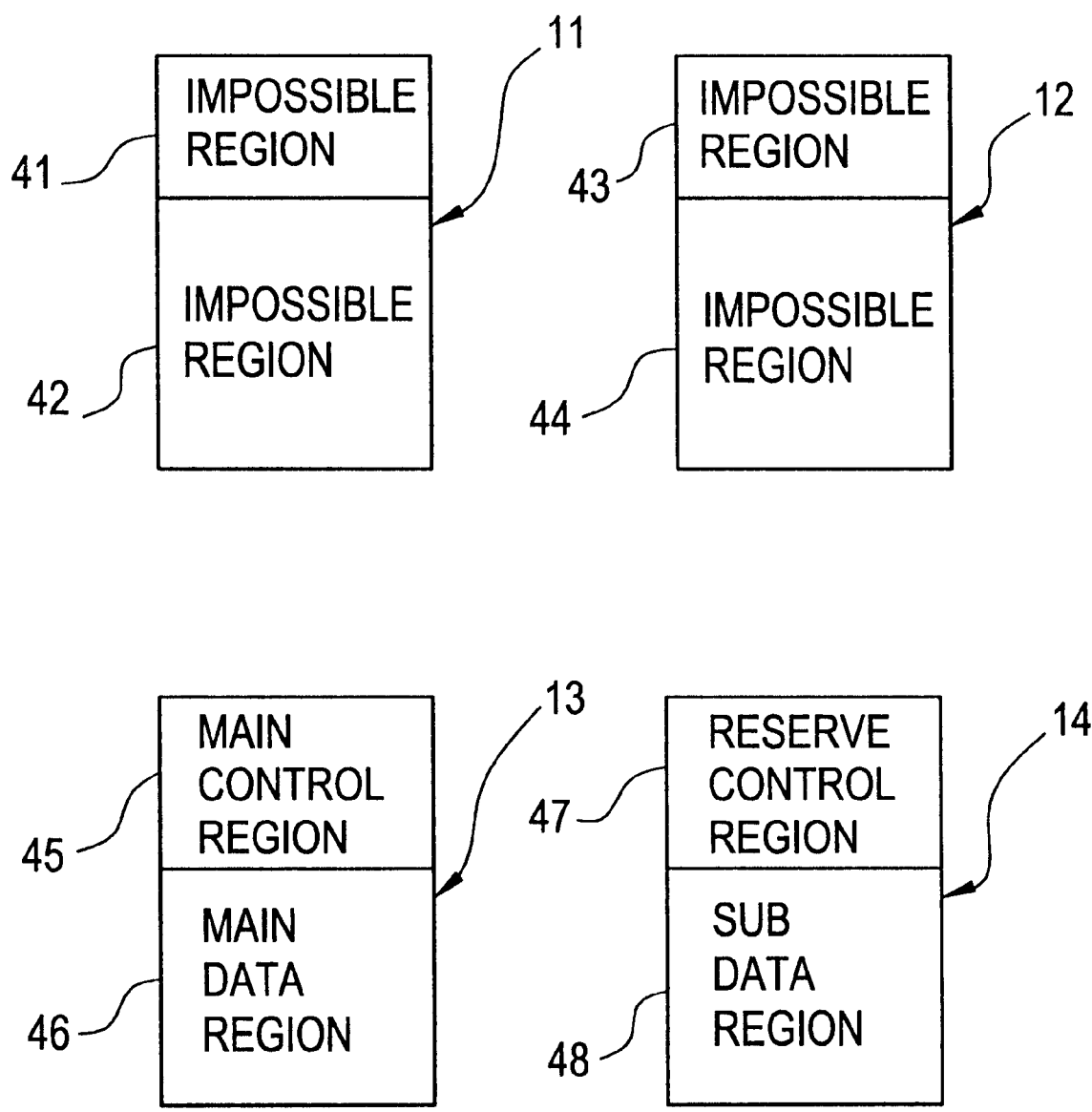
FIG. 4 is a block diagram, showing the control and the data regions of the memory modules of the disk-array apparatus shown In FIG. 3 when another of the memory modules further fails, for illustrating in detail operation of the disk-array apparatus.

Referring to FIGS. 1, 3, and 4, when the second memory module 12 also fails in addition to the first memory module 11 as mentioned above, the main control and the main data regions 33 and 34 (shown in FIG. 3) of the second memory module 12 are appointed as impossible regions 43 and 44 as shown in FIG. 4 by the director modules 15. In addition, the impossible regions 31 and 32 (shown in FIG. 3) of the first memory module 11 is changed ostensibly into the impossible regions 41 and 42 as shown in FIG. 4.

Furthermore, the sub control region 35 (shown in FIG. 3) of the third memory module 13 is also changed into a main control region 45 as shown in FIG. 4 by the director modules 15. In addition, the main data, the reserve control, and the sub data regions 36, 37, and 38 (shown in FIG. 3) are changed ostensibly into main data, reserve control, and sub data regions 46, 47, and 48 as shown in FIG. 4.

During the memory modules 11 and 12 fail as mentioned above and shown in FIG. 4, the director modules 15 inhibit the host 100 from writing/reading data to all of the first to the fourth memory modules 11 to 14. In other word, the director modules 15 inhibit I/O (inputting and Outputting) operation between the host 100 and the all of the first to the fourth memory modules 11 to 14. When the director modules 15 inhibit the I/O operation, the director modules 15 transmit in a short time all of the fast-write data memorized in the third and the fourth memory modules 13 and 14 as the caches to the disk-medium modules 16. Thus, the fast-write data are assured but never lost. Afterward, the first and the second memory modules 11 and 12 failing are repaired or changed into the new memory modules so that the disk-array apparatus is restored in redundancy and can perform the normal mode.

While this invention has thus far been described in conjunction with the embodiment thereof, it will readily be possible for those skilled in the art to put this invention into practice in various other manners.

What is claim is:

1. A disk-array apparatus for use in combination with a host which serves as a data processing apparatus, said disk array apparatus comprising:
   a plurality of disk-medium modules, a plurality of memory modules, and a director module connected to said host, said disk-medium modules, and said memory modules;
   said director module configured to carry out data writing and reading operations to and from said disk-medium modules under control of said host and to temporarily store and load said data to and from said memory modules when said director module carries out said writing and said reading operations;
   said memory modules comprising a first through a fourth memory modules;
   said first and said second memory modules being combined with each other so as to serve as a first memory module-pair;
   said third and said fourth memory modules being combined with each other so as to serve as a second memory module-pair;
   said director module writing, when a failure occurs in said first memory module, fast-write data to said third and said fourth memory modules of said second memory module-pair and appointing two memory modules optionally selected from said second through said fourth memory modules for respectively serve as cache control regions.

2. A disk-array apparatus as claimed in claim 1, wherein said first and said third memory modules are appointed to respectively serve as main data regions;
   said second and said fourth memory modules being appointed to respectively serve as sub data regions.

3. A disk-array apparatus as claimed in claim 2, wherein said first memory module is appointed to serve as a main control region as said cache control region;
   said second memory module being appointed to serve as a sub control region as said cache control region;
   said third and said fourth memory modules being appointed to respectively serve as reserve data regions as said cache control regions.

4. A disk-array apparatus as claimed in claim 3, wherein said director module respectively changes, when the failure occurs in said first memory module, said sub control region of said second memory module into the main control region, said reserve control region of said third memory module into the sub control region, and said sub data region of said second memory module into the main data region.

5. A disk-array apparatus as claimed in claim 4, wherein said director module changes, when the other failure also occurs in said second memory module, said sub control region of said third memory module into the main control region.

6. A disk-array apparatus as claimed in claim 5, wherein said director module inhibits the host from writing/reading data to said first through said fourth memory modules and transits all of said fast-write data memorized in said third and said fourth memory modules.

7. A disk-array apparatus for use in combination with a data processing apparatus, said disk array apparatus comprising:
   a plurality of disk-media means;
   means for first through fourth memory modules, the first and the second memory modules being logically combined with each other so as to serve as a first memory module-pair, and the third and the fourth memory modules being logically combined with each other so as to serve as a second memory module-pair;
   director means coupled to said data processing apparatus and to said plurality of disk-media means, said director means being for carrying out data writing and data reading operations to and from said plurality of disk-media means under control of said data processing apparatus and for temporarily storing said data to said means for first through fourth memory modules, wherein said director means writes data to both memory modules of said second memory module-pair upon detection of a failure in only one memory module of said first memory module pair.

8. The disk array apparatus of claim 7, wherein the means for the first and the third memory modules are appointed to respectively perform main data regions; and the means for the second and the fourth memory modules are appointed to respectively perform sub data regions.

9. A memory array system comprising:
   first through fourth memory modules, the first and the second memory modules being logically connected to serve as a first memory module-pair, and the third and the fourth memory modules being logically connected to serve as a second memory module-pair; and
   a director module coupled to said first through fourth memory modules, wherein upon detection of a failure in only one memory module of said first memory module pair, said director module transmits data to both memory modules of said second memory module-pair.

10. The memory array system of claim 9, wherein said director module is further coupled to a host that serves as a data processing apparatus and to a disk-media array, and wherein said director module writes and reads data to and from said disk-media array under control of said host and temporarily stores said data to said first through fourth memory modules.

* * * * *